May 22, 1934.                    F. B. DUNN                    1,960,101
                        BRICK LUG FORMING MECHANISM
                        Filed Oct. 19, 1931        2 Sheets-Sheet 1
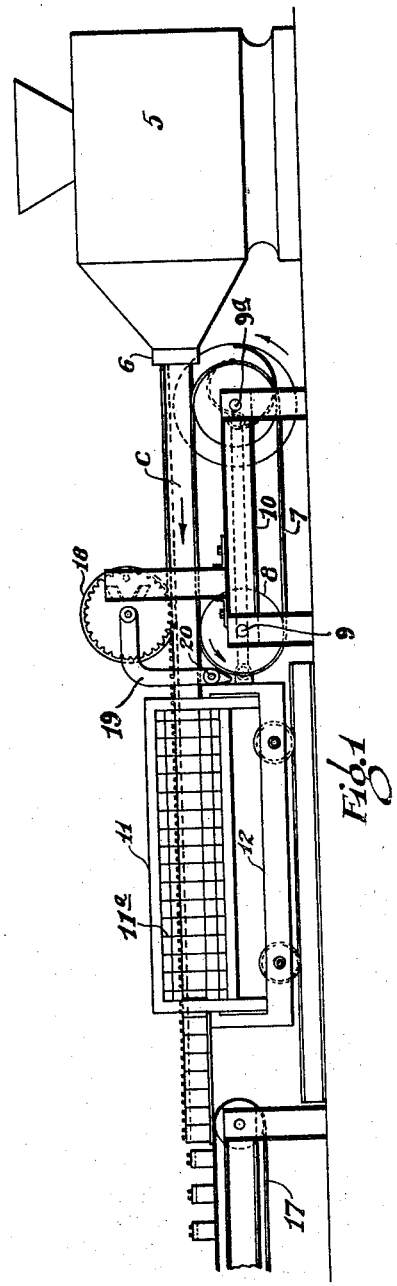
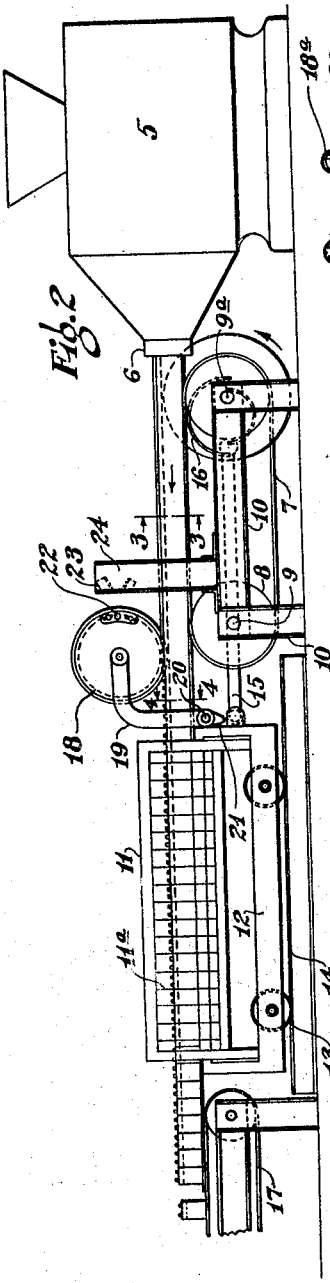
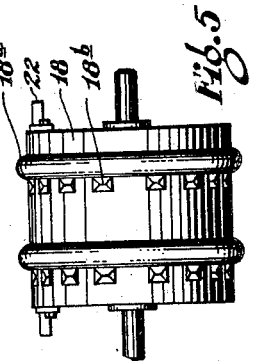
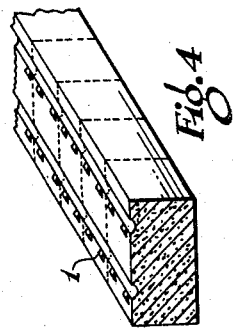
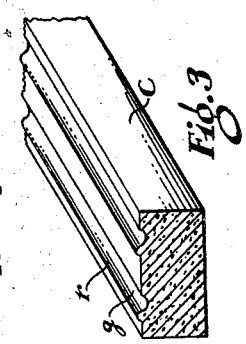
Inventor
Frank B. Dunn.
By Richey J. Watts
Attorney May 22, 1934.  F. B. DUNN  1,960,101
BRICK LUG FORMING MECHANISM
Filed Oct. 19, 1931  2 Sheets-Sheet 2
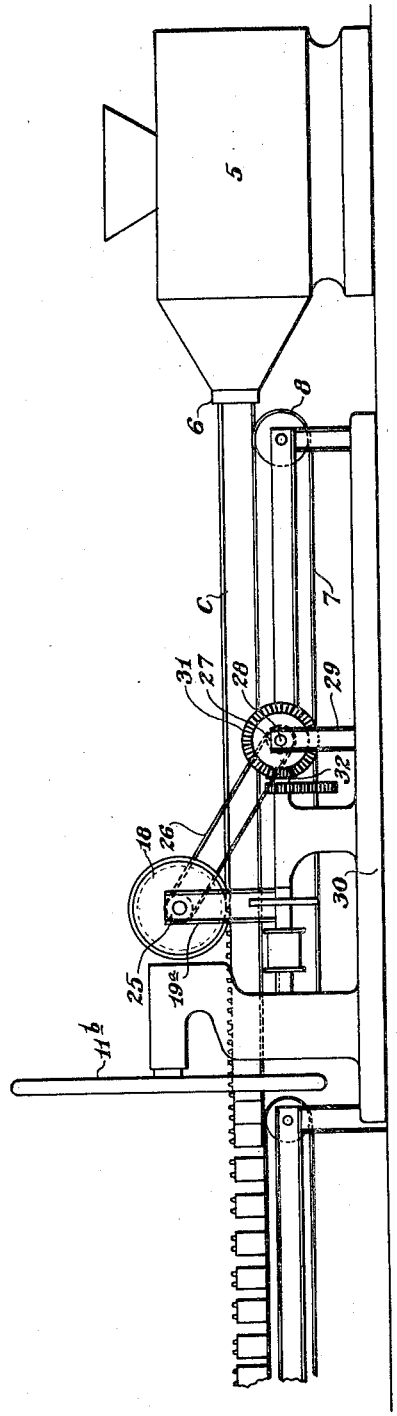
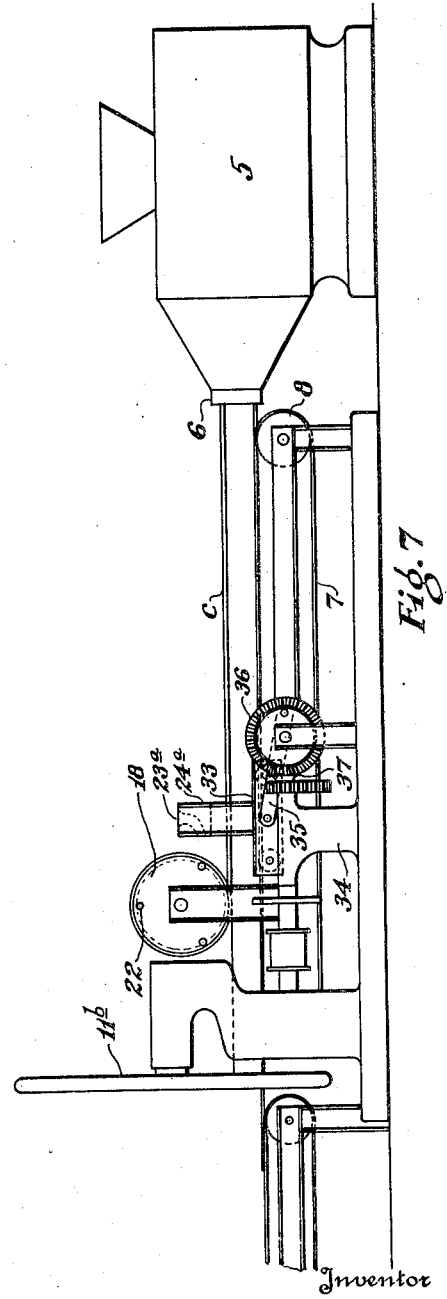
Inventor
Frank B. Dunn.
By Richey J. Watts
Attorney Patented May 22, 1934

1,960,101

UNITED STATES PATENT OFFICE

1,960,101

BRICK-LUG FORMING MECHANISM

Frank B. Dunn, Conneaut, Ohio

Application October 19, 1931, Serial No. 569,660

17 Claims. (Cl. 25—1)

This invention relates to the manufacture of wire cut brick of that type most generally used for paving purposes and wherein spacing elements are formed on one of the faces of each brick to facilitate the flow or entrance of a suitable binding material between the bricks when the latter are laid in a pavement. Such type of brick has become known in the industry as the "wire-cut lug brick" and one of the most advantageous forms of spacing element to date is the co-operating groove and lug type such as is shown and described in my Patent No. 1,447,413, granted March 6, 1923, and in the illustrative embodiment of my present invention, I show this type of spacing element being formed on the brick, it being understood that such showing is merely by way of example.

In forming these co-operating grooves and lugs on the brick the most commonly accepted practice is to first form adjacent grooves and ribs longitudinally on the column of clay as it is extruded through the die of the auger machine and then flatten down portions of the ribs, leaving a series of projecting lugs or studs, the issuing column of clay then being cut transversely at fixed spaced points to form bricks of substantially uniform dimensions, leaving co-operating sets of grooves and studs on one of the uncut faces of each brick.

In my prior patent above noted, I have disclosed a means for forming the studs consisting of guide plate mechanism mounted to co-operate with a laterally reciprocating type of cutter. This mechanism has been found highly practicable. It cannot, however, be readily adapted for use with other types of cutters, such for instance as the rotary cutters quite commonly used, and a number of manufacturers have adopted a roller press for forming the studs which is mounted adjacent the die of the auger machine and bears against the issuing column of clay and is rotated by the latter. Considerable difficulty has been experienced, however, with this type of lug forming device in uniformly positioning the studs on the respective bricks. This is due to the fact that the column of clay has a tendency to compress between the auger machine die and the cutters and also to the fact that the rotary press does not rotate in synchronism with the cutters. Heretofore, as far as known, the roller press has always been mounted adjacent the die of the auger machine, so that it operates on the column prior to variation in length thereof due to compression, greatly increasing the chances of non-uniform positioning of the studs with respect to the points of cut. I overcome this objection by mounting the roller press adjacent the cutters. I also provide means for ensuring cooperative operation of the roller press with respect to the cutters.

It is the principal object of my present invention therefore to provide a lug-forming mechanism which may be used with any type of cutter and which at the same time ensures a substantially uniform positioning of the studs on each respective brick.

With the foregoing and other objects and advantages in view, the invention consists in the preferred construction and arrangement of the several parts which will be more fully hereinafter described and claimed.

In the drawings:—

Figure 1 is a view in side elevation of a conventional type of brick-making machine showing my improved lug or stud-forming mechanism mounted in co-operative relation therewith, the cutter here shown being of the laterally reciprocating type;

Fig. 2 is a view similar to Fig. 1, showing the cutting and lug-forming mechanism in advanced position;

Figs. 3 and 4 are enlarged views in perspective of the issuing clay column taken substantially on the lines 3—3 and 4—4, Fig. 2, showing the column before and after being subjected to the action of the lug-forming roller press;

Fig. 5 is a detail view in front elevation of the said roller press;

Figs. 6 and 7 are views similar to Figs. 1 and 2 showing methods of mounting the roller press in co-operative relation with a brick cutting machine of the rotary type.

First referring to Figs. 1 to 5, inclusive, the reference numeral 5 designates an auger machine of conventional construction having a die 6 mounted at the outlet orifice thereof through which the clay is extruded in the form of a column C onto a measuring belt 7, the latter being mounted on pulleys 8 which are carried by shafts 9 and 9a supported by and having bearing in the framework 10.

A cutter frame 11 provided with spaced cutters 11a is mounted for lateral reciprocation on a horizontally or longitudinally reciprocating carriage 12, the latter being provided with wheels 13 adapted for travel on a track 14. The carriage 12 as here shown may be reciprocated in synchronism with the measuring belt 7 by separate power means which may be controlled through the medium of trip mechanism not shown.

The operation of the above described mechanism is well understood by those having a knowledge of the brick-making art. As the measuring belt 7 carries the column outwardly, it also controls the power means for reciprocating the carriage 12, so that a predetermined length of the column moves with the carriage. As the carriage reciprocates horizontally, the cutter frame 11 is reciprocated laterally, by means not shown, and cuts the column into bricks of a predetermined width, the bricks resting on a slotted bed plate forming part of the carriage 12 and thereafter being advanced onto a conveyor 17, which may extend to any suitable point and from which the bricks may be removed by the stacking crew and placed on the kiln trucks for burning.

It will be understood that any desired cutter mechanism, either of the rotary, reciprocating or other known types, may be supported on the carriage 12 or otherwise mounted to co-operate with the remaining parts of the machine, the laterally reciprocating type of cutter being here shown simply for the purposes of illustration.

As the clay column C issues from the die plate 6, it is formed with longitudinal ribs and grooves as indicated at r and g, Fig. 3, after which portions of the ribs are flattened down at spaced points leaving projecting studs or lugs 1, note Fig. 4, and it is with this latter operation that the present invention is concerned.

A roller press 18 is rotatably supported in bearing brackets 19 which are mounted for limited pivotal action at one end of the truck 12, as at 20, the lower end of each bracket 19 being extended and beveled or tapered at 21, to act as a stop and prevent lowering of the roller 18 beyond a certain point while at the same time permitting the roller to rest on the column of clay C. The face of the roller press 18 is formed with pairs of annular ribs 18a and adjacent recesses defining studs or lugs 18b, so that as the column of clay moves outwardly, the ribs of the press follow in the grooves g of the column while the adjacent face of the die flattens the ribs 1 leaving projecting studs or lugs and spaced points, the column being cut into bricks between each pair of lugs 1, note the dotted lines in Fig. 4.

As heretofore stated, prior to the present invention, the roller 18 was mounted adjacent the die 6 and due to this fact and also to the fact that the roller press and the cutting mechanism did not operate in synchronism, the column would be severed at times at unequal spaced distances with respect to the lugs 1. Minor displacement of the lugs on the faces of the bricks may not be considered a material drawback, but when they are too greatly off center, as it were, or should the cutters cut right through the lugs, the function of the latter becomes seriously affected.

To overcome this objectionable feature, in Figs. 1 and 2, I provide for mounting the roller press adjacent the cutting mechanism and also for centering or spotting the roller each time it operates on a predetermined portion of the clay column. The centering or spotting means as here shown is in the form of a centering or spotting pin or pins 22 which are adjustably mounted in the side of the roller 18 adjacent its circumference and coact with guide or centering devices or blocks 23 attached to an adjustable upright 24.

In operation, the carriage 12 is reciprocated at substantially the same speed as the speed of outward travel of the column of clay, so that on the outward travel of the carriage 12, there is no rotation or angular movement of the roller and if the latter is in its proper predetermined position or setting, the pins 22 will pass between the guide blocks 23 without contacting with the latter. The column of clay is then being cut by the cutters 11a. On the return stroke of the carriage 12, the roller 18 rotates and the pins 22 describe an arc around the guide blocks 23 and come to rest in substantially the position shown in Fig. 1, which shows the position of the roller 18 at or about the beginning of its outward stroke, while Fig. 2 shows the position thereof at the termination of its stroke. Should the roller die be out of its set position, the pins 22 will contact with one of said guide blocks and automatically center the die, the slight relative slippage between the die and column not being sufficient to materially displace the lugs at that point.

The apparatus shown in Figs. 1 and 2 is simple and cheap in construction and does not require a synchronizing connection with the cutter. In Fig. 6, I show the roller 18 connected up and driven in positive synchronism with a rotary type of cutter indicated at 11b. It will be noted that here again the roller is mounted adjacent the cutter. Standards or bearing brackets 19a provide a means for supporting the roller. The shaft on which the roller is mounted is provided with a gear 25 which is connected by means of a sprocket chain 26 with a gear 27 secured on a shaft 28 which is mounted in bearing or supporting brackets 29 which may be fixed to the base 30 of the machine. The shaft 28 is provided with a bevel gear 31 which is in mesh with a pinion 32. The latter may be secured on any shaft which rotates in synchronism with the rotary cutter, as will be understood.

In Fig. 7, I show a structure in which the roller 18 is rotated through friction with the column of clay while the centering device is reciprocated. The centering device indicated at 24a is provided with an arcuately shaped centering groove 23a having a flared mouth adapted to register with the pins 22 on the roller 18, said device being attached to a carriage or like reciprocating frame 33 mounted for travel on a support 34, which may form part of the frame of the cutting machine. The carriage may be reciprocated in synchronism with the cutter by means of a connecting rod 35, crank gear 36 and bevel gear 37, the latter being secured on an adjacent shaft of the machine and meshes with the crank gear 36.

To shorten the stroke of the device 24a, the roller 18 in this instance is provided with a plurality of the centering pins 22 at equally spaced points adjacent the periphery of the roller. The operation is substantially the same as in Figs. 1 and 2 except that in this instance the centering device 24a is reciprocated instead of the roller. It will be understood that the roller in Figs. 1 and 2 could be provided with a plurality of centering pins as in Fig. 7.

It will be noted that in each instance the roller press is mounted adjacent the cutter so that it acts on the column after compression thereof takes place. This is an outstanding feature of the invention, for regardless of whether or not the roller is synchronized or operates in co-operative relation with the cutters, it will not position the studs uniformly if there is a variation in length of the column between the roller and cutters.

I claim:

1. In a brick making machine, means for extruding clay in the form of a column, means for severing the column, a roller press mounted to operate on a face of the column, and a positioning device mounted to reciprocate adjacent the press.

2. In a brick making machine, means for extruding the clay in the form of a column, means for forming lugs and grooves in the face of the column longitudinally of the latter, means for severing said column, a reciprocating carriage for said severing means, a rotatable press connected to said carriage and adapted to depress portions of said ribs, means for reciprocating said carriage and said press, and positioning devices mounted in the path of reciprocation of the press and adapted to co-operate with the latter.

3. In a brick making machine, a rotatable lug forming roller press, a centering pin or pins projecting from said press, and centering devices adapted to co-operate with said pin.

4. In a brick making machine, a rotatable lug forming roller press, a centering pin or pins projecting from said press, and means for reciprocating said roller press and/or centering devices.

5. In a brick making machine, a reciprocating carriage, a roller press mounted to move with said carriage, a pin projecting from said press, and tapered centering devices mounted adjacent the path of reciprocation of said press, said pin being adapted to normally move between said devices.

6. In a brick making machine, means for extruding the clay in the form of a column, cutting mechanism, a carriage for supporting said mechanism, means for reciprocating said carriage longitudinally of the column, a roller mounted for travel with said carriage, one or more pins projecting from the side of said roller, and centering members mounted adjacent the path of reciprocation of said roller, said pins being adapted to move normally between said members.

7. In a machine for making wire cut lug bricks, means for extruding the clay in the form of a column, means for severing said column to form bricks, a rotatable device adjacent said severing means for forming lugs on said bricks, and means for automatically positioning said device with respect to the points of severance of said column.

8. In a machine for making wire-cut lug bricks, means for extruding the clay in the form of a column, a rotating cutter for severing the column, a lug-forming roller press mounted adjacent the point of severance of the column, and means for positively synchronizing the roller press with said rotating cutter.

9. In a machine for manufacturing lugged bricks, means for extruding clay in the form of a column having laterally-spaced longitudinally-extending parallel ribs on one face thereof, means for severing the column to form bricks, and rotating means for depressing spaced portions of said ribs to form lugs on the bricks, said means being mounted to operate on the ribbed face of the column immediately in advance of the point of severance thereof.

10. In a machine for manufacturing lugged bricks, means for extruding clay in the form of a column having laterally-spaced longitudinally-extending parallel ribs on one face thereof, means for severing the column to form bricks, and a rotating die press for depressing spaced portions of said ribs to form lugs on the bricks, said press being mounted to operate independently of said severing means and located adjacent the point of severance of the column to thereby form the studs after the column has assumed a set shape.

11. In a machine for manufacturing lugged bricks, means for extruding clay in the form of a column having laterally-spaced longitudinally-extending parallel ribs on one face thereof, means for severing the column to form bricks, a rotating member for depressing spaced portions of said ribs to form lugs on the bricks, and means for synchronizing the operation of said member with said severing means to ensure substantially uniform positioning of the lugs with respect to the plane of severance.

12. In a machine for manufacturing lugged bricks, means for extruding clay in the form of a column having laterally-spaced longitudinally-extending parallel ribs on one face thereof, means for severing the column to form bricks, a press member mounted to operate on the face of the column and adapted to depress spaced portions of said ribs, and means acting independently of said severing means for automatically positioning said press member.

13. In a machine for manufacturing lugged bricks, means for extruding clay in the form of a column having laterally-spaced longitudinally-extending ribs on one face thereof, means for severing the column to form bricks, a rotatable press member mounted to operate on the face of the column to depress spaced portions of said ribs, and means acting independently of said severing means for automatically positioning said member.

14. In a machine for manufacturing wire cut lug bricks, means for extruding clay in the form of a column having laterally-spaced longitudinally-extending parallel ribs on one face thereof, a laterally reciprocating cutter for severing the column to form bricks, means for reciprocating the cutter longitudinally of the column to permit the cutter to move with the column during the severing operation, a roller die mounted to operate on the face of the column to depress spaced portions of said ribs, and means for positioning said die with respect to the face of the column.

15. In a machine for manufacturing lugged bricks, means for extruding clay in the form of a column having laterally-spaced longitudinally-extending parallel ribs on the face thereof, means for severing the column to form bricks, a rotatable press member mounted to operate on the face of the column to depress spaced portions of said ribs, and means for automatically positioning said roller press, said means being independent of said severing means to permit the use of varying types of the latter.

16. In a machine for manufacturing wire cut lugged bricks, means for extruding clay in the form of a column having laterally-spaced longitudinally-extending parallel ribs on the upper face thereof, means for severing the column to form bricks, a rotatable lug-forming die operating by gravity to depress spaced portions of said ribs leaving projecting lugs on the face of the column, and means for automatically positioning said die with respect to the face of the column to insure uniform positioning of said lugs.

17. In a machine for manufacturing wire cut lugged bricks, means for extruding clay in the form of a column, a rotatable lug forming die mounted to operate by gravity on the face of the column, and means for positioning said die with respect to the face of the column to insure uniform positioning of the lugs formed thereby.

FRANK B. DUNN.